United States Patent [19]

Giles

[11] 3,898,098
[45] Aug. 5, 1975

[54] PROCESS FOR PRODUCING IRON ELECTRODE
[75] Inventor: Robert D. Giles, Sutton Coldfield, England
[73] Assignee: The International Nickel Company, Inc., New York, N.Y.
[22] Filed: May 31, 1974
[21] Appl. No.: 475,289

Related U.S. Application Data
[63] Continuation-in-part of Ser. No. 262,666, June 14, 1972, abandoned.

[30] Foreign Application Priority Data
June 21, 1971 United Kingdom............... 28977/71
Mar. 10, 1972 United Kingdom............... 11360/72

[52] U.S. Cl..................................... 136/25; 136/76
[51] Int. Cl. ........................................... H01m 35/00
[58] Field of Search.............. 136/25, 34, 35, 75–78, 136/120 R, 154; 204/48, 10

[56] References Cited
UNITED STATES PATENTS
2,464,168  3/1949  Balke..................................... 204/10
2,871,281  1/1959  Moulton et al. ....................... 136/25
3,345,212  10/1967  Schweitzer............................ 136/25

*Primary Examiner*—Anthony Skapars
*Attorney, Agent, or Firm*—Francis J. Mulligan, Jr.; Ewan C. MacQueen

[57] ABSTRACT

Process for producing electrode structures which are suitable for use as the negative electrode in nickel-iron storage batteries. The active mass is electrodeposited under controlled conditions from an aqueous electrolyte containing ferrous ions and ammonium ions, and preferably, in addition, a sulphur containing compound and a buffering agent to maintain the pH in the range of 1 to 5.5. The electrolyte can also contain a small amount of copper ion.

7 Claims, No Drawings

PROCESS FOR PRODUCING IRON ELECTRODE

This application is a continuation-in-part of U.S. application Serial No. 262,666, filed June 14, 1972, now abandoned.

The present invention is directed to electrodes having a very large metallic surface area and to novel methods for preparing these electrode structures. The electrodes are particularly suitable for use as the negative electrode in nickel-iron batteries.

Nickel-iron cells have a combination of properties which makes them very useful as an industrial battery. For example, they are virtually foolproof electrically: they are not damaged by being short-circuited, reverse-charged, overcharged, or overdischarged. They can be stored indefinitely without deterioration and there is no corrosion of battery components by the electrolyte. These cells are particularly useful in heavy duty industrial applications where a very deep discharge is performed each operational cycle, in standby power applications where very long operational life is required and in some portable equipment such as lighting units where high cycle life is imperative.

In general, an efficient battery design reduces the total weight of the battery and has a high weight ratio of active mass to the metal which holds or supports it. However, because conventional negative active mass does not adhere to the supporting structure, the positive and negative electrodes as used today are almost identical with the original electrodes as designed by Edison. Basically, they consists of finely perforated sheet steel pocket plates attached to an electrode structure, with the active material contained in these small, rectangular, box-like pockets. This design provides a very large surface area of active mass but increases the weight and manufacturing cost of the battery.

The positive active material in a form of nickelous hydroxide whereas the negative active material is iron partially oxidized to the ferrous state. The procedures for producing the active materials have been designed to yield the highest purity material possible, as well as the particle characteristics necessary for optimum electrochemical performance. Various procedures can be used to produce the negative active material. For example, pure iron is dissolved in sulphuric acid and the resultant ferrous sulfate is recrystallized and centrifuged. It is dried at a temperature of about 500°C. and oxidized to the ferric state. Traces of sulfate are washed out and the material is dried and reduced in a furnace under a hydrogen atmosphere. It is then partially oxidized, resulting in a mixture of ferrous oxide and metallic iron which is dried, ground, and blended for uniformity. This negative active material which is commonly a mixture of alpha iron and magnetite, is also produced by flooding pure, finely divided iron with hot water and then heating it in the presence of air or steam-heated tables to produce a powdery mixture of alpha-iron and $Fe_3O_4$. To produce the electrode, the negative active material is then rammed into tubes or pockets on the electrode structure, which act as current conductors. As can be seen from the above, the production of electrodes for nickel-iron storage batteries is a lengthy and complex process.

It is an object of this invention to provide a method of forming the negative active mass by electrolytic deposition directly onto conducting supports used as the structure for the negative electrode.

Another object of the invention is to provide an electrode suitable for use as the negative electrode in nickel-iron storage batteries.

Generally speaking, the negative active mass is electrolytically deposited on a starting sheet from an electrolyte solution containing ferrous ions and ammonium ions such as are present in an aqueous solution of ferrous ammonium sulfate. Under controlled conditions of operation a colloidal deposit of black iron oxide having a very large surface area is produced.

It is essential to control the pH so that the deposited mass is at least in part in an oxidized state. The presence in the mass of substantial proportions of finely-divided unoxidized iron, e.g., 30% to 50% or even up to 60% by weight, is not seriously disadvantageous, but preferably the mass is wholly or mainly oxidic. At low pH's essentially pure iron is deposited on the support and at high pH's ferrous hydroxide is electro-precipitated from the electrolyte. The pH control however, is dependent somewhat on the cathode current density. While a high current density is, in general, desirable, it leads to evolution of hydrogen and reduces the adhesion of the active mass to the support. The cathode current density may be as high as about 140 milliamperes per square centimeter ($mA/cm^2$) and when greater than about 100 $mA/cm^2$ the pH may be as low as about 2.5 but must not be less than about 1.0. The pH may be as high as about 4.4 at which point ferrous hydroxide starts to electroprecipitate. The pH should not excees about 5.5 since gross precipitation of ferrous hydroxide from the solution then occurs.

The thickness of the deposit produced increases substantially in proportion to the duration of electrolysis, and the duration of the electrolysis under otherwise standard conditions therefore provides a convenient practical means of controlling the thickness of the deposit. The thickness may conveniently be from 10 to 100 microns on foil electrodes, though greater thicknesses may be produced if the active mass is to be removed from the support.

In carrying the invention into practice, it is preferred to make up the electrolyte with ferrous ammonium sulfate at a concentration of about 0.1 to about 0.65 molar. Other salts such as ferrous ammonium sulfamate or ferrous fluoborate or ferrous phosphate (either or both used in association with an ammonium salt) may also be used. These salts can be used in stoichiometrically equivalent amounts to those amounts used with ferrous ammonium sulfate or in greater amounts if solubility permits or in lesser amounts if the time of activation can be extended. The electrolysis preferably carried on in a temperature range of from about room temperature to 30°C. The cathode current density is preferably in the range of about 20 to about 100 $mA/cm^2$. Within this range, the pH of the electrolyte should be at least about 2.5 and is preferably in the range of about 3 to 4 or 4.4.

As described above, pH control is essential to the electrolysis. To aid in this control it is preferred that the electrolyte be buffered. The preferred buffering agent is a dihydrogen phosphate of an alkali metal, preferably sodium, which may be added to the electrolyte as such or as alkali and phosphoric acid. Sodium dihydrogen phosphate at a concentration from about 0.1 to about 0.5 molar is preferred. Other buffering agents such as alkali metal tartrates and lactates may also be used. The deposit is found to contain a small innocuous quantity of the buffering agent anion, this quantity varying with the current density and buffering agent concentration. Adjustment of the pH may be made by the addition of such compounds as caustic alkali.

To achieve still greater electrode properties, it is preferred to introduce a small quantity of sulphur into the deposit, either as elemental sulphur or a iron sulfide. It has been found that this vastly increases the cycle life of the battery. The sulphur is preferably introduced by adding sodium metabisulphite to the electrolyte at a concentration of about $10^{-4}$ to about $10^{-2}$ molar. Other sulphur containing compounds in stoichiometrical equivalent amounts (based upon sulphur content) such as thiourea and sodium thiosulphate can also be use used. Colloidal sulphur may be introduced into the deposit from a sulphur containing buffering agent, e.g., a sodium sulphite-sulphurous acid buffer solution. During the electrolysis this solution is partly decomposed producing colloidal sulphur. These compounds are all water soluble and contain sulphur in an oxidation state lower than the oxidation state of sulphur in the sulphate ion but are incapable of releasing into the electrolyte any significant amount of sulphide iron (e.e., any amount of sulfide ion which will cause precipitation of iron sulfide in the electrolyte). The sulphur introduced into the deposited active mass is preferably at least about 0.1% by weight of the metal present in said active mass, e.g., 0.1% to 1% or even up to about 5%. As an alternative sulphur, in similar amounts, can be introduced into the battery active mass by subsequently electrolyzing a sulphur-free active mass on an electrode in an aqueous solution of a base and an alkali metal sulfide or polysulfide. To accomplish this, activate electrode foils containing sulphurfree active iron battery mass are advantageously charged in a strong potassium hydroxide solution containing about 1.5 g/l of lithium hydroxide and about $10^{-3}$ to about $10^{-1}$ mole per liter of an alkali metal sulfide or poly-sulfide.

In addition to sulphur, small quantities of copper can usefully be incorporated in the active deposit during its formation. The cooper is present as a soluble salt, preferably the sulfate, in the activating solution and is co-deposited with the iron active mass to give a finely divided product. Copper in the deposit can be in amounts up to about 20% by weight, e.g., about 1% to about 20% by weight of the iron in the iron active mass. When copper is present unoxidized material in the active mass can be as high as about 60% by weight (total metallic iron plus metallic copper). However, it is much more advantageous to restrict the unoxidized (metallic) content of the active mass to a maximum of about 50% or even 40% by weight.

For the purpose of giving those skilled in the art a better understanding of the invention, and/or a better appreciation of the invention, the following examples are given. In each example active mass was deposited on nickel foil 7 microns thick by electrolysis at room temperature using soluble iron anodes in Examples 1 through 10. The initial capacity in milliampere-hours (mA) per square centimeter of electrode surface after full charging by passage of 120% to 150% of electrode capacity was determined in a solution containing 20% KOH and 1.5 gram per liter LiOH against a mercury-mercuric oxide reference electrode before the voltage fell to −0.6 volts. Where specified, the capacity was also determined after various numbers of cycles of full charge and discharge in the same solution.

EXAMPLE 1

The electrolyte contained 0.6M ferrous ammonium sulphate ($FeSO_4(NH_4)_2SO_4 6H_2O$) and 0.5M sodium dihydrogen phosphate ($NaH_2PO_4.2H_2O$), the pH being 3.1. Current flowed at a cathodic current density of 70 milliamperes per square centimeter ($mA/cm^2$) for a period of 12.8 minutes. The gain in weight was 6.8 milligrams per square centimeter ($mg/cm^2$) and the thickness of the deposit on each face of the foil was 62 microns. The initial capacity was 1.6 $mAh/cm^2$. The capacity after 10 cycles was 0.2 $mAh/cm^2$.

EXAMPLE 2

The electrolyte was the same as in Example 1 except that the pH was adjusted to 3.3 by the addition of 0.2M NaOH. The cathodic current density was 50 $mA/cm^2$, and at the end of 18 minutes the weight gain was 12.24 $mg/cm^2$ and the thickness of the deposit on each face of the foil was 100 microns. The initial capacity was 1.56 $mAh/cm^2$. The capacity after 10 cycles was 0.18 $mAh/cm^2$.

EXAMPLE 3

The electrolyte contained 0.4M ferrous ammonium sulphate 0.2M sodium dihydrogen phosphate, 0.1M sodium hydroxide and 0.001M sodium metabisulphite, the pH being 3.6. The current density was 90 $mA/cm^2$ for a duration of 12 minutes. The weight of active mass deposited was 1.210 gram (g) and the amount of sulphur deposited 0.163% by weight. The weight gain was 6.05 6.05 $mg/cm^2$ and the proportion of iron in the active mass 77%. The capacities found in various cycles were as follows:

| | | |
|---|---|---|
| 1st cycle | 1.28 | $mAh/cm^2$ |
| 20th cycle | 2.36 | '' |
| 40th cycle | 2.34 | '' |
| 100th cycle | 1.83 | '' |

EXAMPLE 4

The electrolyte contained 0.6M ferrous ammonium sulphate, 0.6M sodium dihydrogen phosphate and 0.00006M sodium metabisulphite. The current density was 70 $mA/cm^2$ and the duration 12.8 minutes. The weight of active mass was 1.560 g. and the amount of sulphur deposited 0.10 by weight. The weight gain was 7.8 $mg/cm^2$ and the iron content of the deposit 67%. Capacities were ascertained as follows:

| | | |
|---|---|---|
| 1st cycle | 0.89 | $mAh/cm^2$ |
| 20th cycle | 0.63 | '' |
| 40th cycle | 0.34 | '' |
| 100th cycle | 0.06 | '' |

EXAMPLE 5

Example 4 was repeated except that the sodium metabisulphite content of the electrolyte was increased to 0.0006M. The weight of active mass was 1.490g. and the amount of sulphur deposited 0.4% by weight. The weight gain was 7.5 $mg/cm^2$ and the iron content 62%. Capacities were ascertained as follows:

| | | |
|---|---|---|
| 1st cycle | 0.86 | $mAh/cm^2$ |
| 20th cycle | 1.66 | '' |

| | -Continued | |
|---|---|---|
| 40th cycle | 1.37 | " |
| 100th cycle | 0.56 | " |

EXAMPLE 6

The electrolyte contained 0.5M ferrous ammonium sulphate, 0.1M lactic acid, 0.033M sodium hydroxide and 0.001M sodium metabisulphite, the pH being 3.7. The current density was 70 mA/cm$^2$ for a duration of 9 minutes and resulted in a weight gain of 4.1 mg/cm$^2$. The initial capacity was 0.52 and in the 9th cycle 0.50. mAh/cm$^2$.

EXAMPLE 7

The electrolyte contained 0.5M ferrous ammonium sulphate, 0.1M tartaric acid, 0.066M sodium hydroxide and 0.001M sodium metabisulphite, the pH being 2.7. The current density was 70 mA/cm$^2$, the duration 9 minutes and the weight gain 6.05 mg/cm$^2$. The initial capacity was 1.31, but this had fallen to 0.46 in the 9th cycle.

EXAMPLE 8

The electrolyte contained 0.6M ferrous ammonium sulphate, 0.1M sodium dihydrogen phosphate and 0.002M thiourea. The current density was 70 mA/cm$^2$, the duration 12.8 minutes. The weight of active mass was 2.240 g. and the amount of sulphur deposited 0.17% by weight. The weight gain was 11.2 mg/cm$^2$ and the iron content in the deposit 63%. Capacities were ascertained as follows:

| 1st cycle | 0.92 | mAh/cm$^2$ |
|---|---|---|
| 20th cycle | 0.61 | " |
| 40th cycle | 0.87 | " |
| 100th cycle | 1.36 | " |

EXAMPLE 9

Example 8 was repeated except that the thiourea was replaced by 0.002M sodium thiosulphate. The weight gain was 10.8 mg/cm$^2$ and the iron content in the deposit 75.5%. Capacities were ascertained as follows:

| 1st cycle | 1.09 | mAh/cm$^2$ |
|---|---|---|
| 20th cycle | 0.67 | " |
| 40th cycle | 2.27 | " |

EXAMPLE 10

The electrolyte contained 0.5M ferrous ammonium sulphate and 0.03M sodium sulphite. Sulphur dioxide was bubbled into the solution to give a content of about 0.1M sulphurous acid, the pH of the electrolyte then being 3.8. The current density was 60 mA/cm$^2$, the duration 10 minutes and the weight gain 4.3 mg/cm$^2$. The initial capacity was 0.93 and this increased to 1.02 in the 20th cycle.

EXAMPLE 11

A battery electrode was made by depositing active mass on a thin foil from an electrolyte containing 0.4M of ions derived from ferrous ammonium sulphate, 0.1M lactic acid, 0.05M sodium hydroxide, 0.04M cupric sulphate and having a pH of 2.15. Activation current density was 50 mA/cm$^2$ for 14 minutes to provide a weight gain of 14.5 mg/cm$^2$. The thus-formed electrode was charged in an aqueous solution containing 20% by weight KOH plus 1.5g/l LiOH and 7 × 10$^{-3}$M sodium sulphide to incorporate about 0.1% to about 1% by weight of sulphur in the iron active mass. The electrode is thereafter cycled in 20% KOH plus 1.5g/l LiOH. The capacity of the electrode was as follows:

| Initial | 5.9 | mAh/cm$^2$ |
|---|---|---|
| 20 cycles | 5.1 | " |
| 40 cycles | 5.1 | " |
| 60 cycles | 4.9 | " |

In depositing battery active mass as in Example 11 where copper is present in the electrolyte it is advantageous to avoid the use of consumable iron anodes as copper will deposit on the surface thereof and thus be removed from the bath. In those situations where no copper is present in the electrlyte use of consumable anodes is highly advantageous.

It is advantageous to deposit battery active mass in accordance with the process of the present invention on perforated foil substrates such as disclosed in the Edwards et al U.S. application Ser. No. 222,019 filed Jan. 31, 1972 and to employ the coated perforated foil substrates in stacks as battery electrodes. Alternatively, because the iron active mass as produced by the process of the present invention is more efficient, from an electrochemical point of view, in the interconversion of chemical and electrical energy, than iron active mass of the prior art, it is also advantageous to electrodeposit the iron active mass of the present invention on a temporary substrate, thereafter remove it and employ it in the manufacture of pocket cells described hereinbefore.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method for producing iron active mass which comprises electrodepositing said mass on a cathode from an aqueous electrolyte containing ferrous ion and ammonium ion said electrolyte being characterized by having a pH of about 2.5 to 5.5 and the electrodeposition being characterized by controlled interrelation of cathode current density, pH and composition of the electrolyte to provide an electrodeposit of iron active mass comprising essentially oxidic iron with no more than about 60% by weight of the active mass being in the metallic unoxidized state.

2. A method as in claim 1 wherein the ferrous ion and ammonium ion are derived from a ferrous ammonium salt selected from the group consisting of ferrous ammonium sulphate, and ferrous ammonium sulphamate.

3. A method as in claim 2 which comprises maintaining the ferrous ammonium salt at a concentration of from about 0.1M to about 0.65M, and electrodepositing at a cathode current density up to about 140 milliamperes per square centimeter.

4. A method as in claim 3 wherein the cathode current density is about 20 to about 100 mA/cm$^2$.

5. A method as in claim 4 wherein the pH is about 3 to about 4.4.

6. A method as in claim 3 wherein the pH is maintained within the required range by buffering the electrolyte with a buffer selected from the group consisting of alkali metal phosphates, alkali metal tartrates and alkali metal lactates.

7. A method as in claim 1 where the electrolyte contains a water soluble, sulphur containing material having sulphur in an oxidation state lower than the oxidation state of sulphur in the sulfate ion and which is incapable of releasing into the electrolyte any significant amount of sulfide ion.

* * * * *